US012689051B2

(12) United States Patent
Sato

(10) Patent No.: US 12,689,051 B2
(45) Date of Patent: Jul. 21, 2026

(54) ACTIVATION METHOD FOR FUEL CELL AND DEVICE THEREFOR

(71) Applicant: HONDA MOTOR CO., LTD., Tokyo (JP)

(72) Inventor: Koichiro Sato, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 700 days.

(21) Appl. No.: 18/122,981

(22) Filed: Mar. 17, 2023

(65) Prior Publication Data

US 2023/0307678 A1 Sep. 28, 2023

(30) Foreign Application Priority Data

Mar. 28, 2022 (JP) ................................. 2022-051949

(51) Int. Cl.
H01M 8/1004 (2016.01)
H01M 8/04014 (2016.01)
H01M 8/04492 (2016.01)
H01M 8/04858 (2016.01)

(52) U.S. Cl.
CPC ..... H01M 8/1004 (2013.01); H01M 8/04014 (2013.01); H01M 8/04514 (2013.01); H01M 8/04522 (2013.01); H01M 8/04873 (2013.01)

(58) Field of Classification Search
CPC ........... H01M 8/1004; H01M 8/04014; H01M 8/04514; H01M 8/04522; H01M 8/04873
USPC ....................................................... 429/400
See application file for complete search history.

(56) References Cited

U.S. PATENT DOCUMENTS

| | | | |
|---|---|---|---|
| 2017/0263965 A1* | 9/2017 | Jeong ................... | H01M 8/1006 |
| 2017/0338499 A1 | 11/2017 | Murata et al. | |
| 2018/0083299 A1* | 3/2018 | Mei ...................... | H01M 8/0488 |
| 2018/0301732 A1* | 10/2018 | Lee ................... | H01M 8/04223 |
| 2019/0006687 A1 | 1/2019 | Tsuge et al. | |
| 2019/0305347 A1 | 10/2019 | Toyota et al. | |
| 2020/0099071 A1 | 3/2020 | Kosai et al. | |
| 2024/0030461 A1* | 1/2024 | Otake ................. | H01M 8/0234 |

FOREIGN PATENT DOCUMENTS

| | | |
|---|---|---|
| JP | 2005-340022 A | 12/2005 |
| JP | 2009-117066 A | 5/2009 |
| JP | 2010-192221 A | 9/2010 |
| JP | 2010-267563 A | 11/2010 |

(Continued)

OTHER PUBLICATIONS

Office Action dated Feb. 6, 2024 issued in the corresponding Japanese Patent Application 2022-051949 with the English machine translation thereof.

(Continued)

*Primary Examiner* — James M Erwin
(74) *Attorney, Agent, or Firm* — Carrier, Shende & Associates P.C.; Joseph P. Carrier; Jeffrey T. Gedeon

(57) ABSTRACT

In a case that activation is implemented on a fuel cell, a variable voltage is applied to a membrane electrode assembly while a first gas is supplied to an anode and a second gas is supplied to a cathode. Thereafter, while a constant voltage is applied to the membrane electrode assembly, liquid water is generated at the anode or the cathode. Alternatively, the membrane electrode assembly is made to generate electricity. During the generation of electricity, liquid water is generated at the anode or the cathode.

13 Claims, 9 Drawing Sheets

(56)                    References Cited

FOREIGN PATENT DOCUMENTS

| | | | |
|---|---|---|---|
| JP | 2017-208299 | A | 11/2017 |
| JP | 2019-012599 | A | 1/2019 |
| JP | 2019-128976 | A | 8/2019 |
| JP | 2019-175815 | A | 10/2019 |
| JP | 2019-175816 | A | 10/2019 |
| JP | 2020-047560 | A | 3/2020 |
| JP | 2020-113470 | A | 7/2020 |
| JP | 2020-129568 | A | 8/2020 |

OTHER PUBLICATIONS

Office Action and Search Report dated Apr. 15, 2026 issued in the corresponding Chinese Patent Application No. 202310265152.3 with the English machine translation thereof.
Zhang Junliang et al., "Fuel Cells—Principles, Key Materials and Technologies", Dec. 2024, Published by Shanghai Jiaotong University Press, p. 60.

\* cited by examiner

A: TEMPERATURE OF SECOND HEAT PIPE

B: AMOUNT OF LIQUID WATER OF Ca

C: DIFFERENTIAL PRESSURE OF Ca

D: APPLIED VOLTAGE

ACTIVATION METHOD FOR FUEL CELL AND DEVICE THEREFOR

CROSS-REFERENCE TO RELATED APPLICATIONS

This application is based upon and claims the benefit of priority from Japanese Patent Application No. 2022-051949 filed on Mar. 28, 2022, the contents of which are incorporated herein by reference.

BACKGROUND OF THE INVENTION

Field of the Invention

The present invention relates to an activation method for activating a membrane electrode assembly for a fuel cell including an electrolyte membrane and an anode and a cathode sandwiching the electrolyte membrane therebetween. Further, the present invention also relates to an activation device for activating such a membrane electrode assembly.

Description of the Related Art

In recent years, a fuel cell vehicle (FCV: Fuel Cell Vehicle) equipped with a fuel cell has attracted attention as a vehicle in which the environmental impact thereof is small. The fuel cell generates electricity based on an electrochemical reaction occurring between an oxygen-containing gas containing oxygen and a fuel gas containing hydrogen. As can be understood from this feature, this is because the fuel cell vehicle only emits water vapor and does not emit carbon dioxide ($CO_2$), NOx, and SOx or the like. In the fuel cell vehicle, an electric motor is driven using electrical power obtained from the fuel cell. In accordance with this feature, the fuel cell vehicle is capable of traveling.

The fuel cell comprises a membrane electrode assembly (MEA). The MEA is made up from a solid polymer electrolyte membrane having a first end surface and a second end surface, an anode provided on the first end surface of the electrolyte membrane, and a cathode provided on the second end surface of the electrolyte membrane. More specifically, the MEA is constructed by interposing the electrolyte membrane between the anode and the cathode. A unit cell of the fuel cell is assembled by sandwiching the MEA between a pair of separators.

In the unit cell immediately after having been assembled, a portion of the surface of the electrode catalyst which is made from a metal is covered with impurities such as oxides or mixed organic matter or the like. Since these are toxic substances that inhibit reaction of the electrodes, a sufficient electrical power generation performance is incapable of being obtained in the unit cell. In order to avoid this difficulty, activation is carried out with respect to the fuel cell prior to the first operation thereof. For example, in the activation method disclosed in JP 2019-175816 A, a cycle of operation in which CV aging of applying a variable voltage to the fuel cell is performed and thereafter a hydrogen pumping operation is carried out is repeated a plurality of times. Due to the activation being carried out in this manner, the toxic substances are stripped from the electrode catalyst.

Further, in the activation method disclosed in JP 2020-129568 A, an electrical power generation aging process is performed in which the fuel cell generates electrical power while the cell voltage is varied. In this instance, when the fuel cell generates electrical power, a wet reactant gas containing water vapor is supplied to the anode and the cathode. The cell voltage, for example, is controlled by changing a flow rate, a compounding ratio, or the gas type or the like of the wet reactant gas. Alternatively, the cell voltage is controlled by adjusting a load current that is extracted from the fuel cell.

At a time when the fuel cell generates electricity, water is produced based on an electrode reaction at the cathode. Liquid water is generated when the water vapor and the produced water condense. The toxic substances that are stripped from the electrode catalyst are discharged to the exterior of the fuel cell together with the liquid water.

Depending on the circumstances, CV aging and electrical power generation aging are combined.

SUMMARY OF THE INVENTION

In the CV aging process, toxic substances that have been stripped from the electrode catalyst may be re-adsorbed on the electrode catalyst. Further, in the electrical power generation aging process, the cell voltage rises during the generation of electrical power. Accordingly, it is not easy to cause the cell voltage to be reduced to a predetermined lower limit value, even if the flow rate of the wet reactant gas, the compounding ratio, or the gas type is changed, or even if the load current is adjusted. For this reason, it is difficult to improve the stripping efficiency at which the toxic substances that are adhered to the surface of the electrode catalyst are stripped. For the reasons described above, it is not easy to further enhance the degree of activation of the fuel cell.

The present invention has the object of solving the aforementioned problems.

According to one aspect of the present invention, there is provided an activation method for a fuel cell, for activating a membrane electrode assembly for use by the fuel cell including an electrolyte membrane and an anode and a cathode sandwiching the electrolyte membrane therebetween, the activation method including an aging step of applying a variable voltage from a voltage application unit to the membrane electrode assembly while supplying a first gas to the anode from an anode side flow path, and supplying a second gas to the cathode from a cathode side flow path, and a voltage application step of applying a voltage of a constant value from the voltage application unit to the membrane electrode assembly while supplying the first gas to the anode from the anode side flow path, and supplying the second gas to the cathode from the cathode side flow path, wherein, in the voltage application step, liquid water is generated in the anode or the cathode, and an amount of the liquid water is adjusted by a liquid water amount adjustment unit.

According to another aspect of the present invention, there is provided an activation method for a fuel cell, for activating a membrane electrode assembly for use by the fuel cell including an electrolyte membrane and an anode and a cathode sandwiching the electrolyte membrane therebetween, the activation method including an electrical power generation step of causing electrical power to be generated in the membrane electrode assembly while supplying a first gas to the anode from an anode side flow path, and supplying a second gas to the cathode from a cathode side flow path, wherein, in the electrical power generation step, a generated electrical voltage of the membrane electrode assembly is repeatedly raised and lowered, and an amount of liquid water generated in the anode or the cathode is adjusted by a liquid water amount adjustment unit.

According to still another aspect of the present invention, there is provided an activation device that activates a membrane electrode assembly for use by a fuel cell including an electrolyte membrane and an anode and a cathode sandwiching the electrolyte membrane therebetween, the activation device including a first gas supply line configured to supply a first gas to the anode, a second gas supply line configured to supply a second gas to the cathode, a voltage application unit configured to apply a voltage to the membrane electrode assembly, and a liquid water amount adjustment unit configured to cause liquid water to be generated in the anode or the cathode, and to adjust an amount of the liquid water.

According to another further aspect of the present invention, there is provided an activation device that activates a membrane electrode assembly for use by a fuel cell including an electrolyte membrane and an anode and a cathode sandwiching the electrolyte membrane therebetween, the activation device including a first gas supply line configured to supply, to the anode, a first gas in order to generate electricity, a second gas supply line configured to supply, to the cathode, a second gas in order to generate electricity, and a liquid water amount adjustment unit configured to adjust an amount of liquid water generated at the anode or the cathode while the membrane electrode assembly is generating electricity.

By the application of the variable voltage or by the generation of electrical power, toxic substances are stripped from each of the electrode catalyst of the anode and the electrode catalyst of the cathode. The toxic substances which have been stripped from the electrode catalysts are accompanied by liquid water that is produced by applying a constant voltage or by liquid water that is produced by the power generation, and the toxic substances are discharged from the anode side flow path or the cathode side flow path. Accordingly, re-adsorption of the toxic substances to the electrode catalyst is suppressed.

Further, in the electrical power generation aging process, when the amount of the liquid water in the anode side flow path or the cathode side flow path is increased at the time when the electrical power is generated, a concentration overpotential of the cell increases. Consequently, even in a state in which the activation overpotential is lowered, it is possible to cause the generated electrical voltage of the membrane electrode assembly to be lowered to a predetermined lower limit value. Accordingly, it is possible to cause the degree of activation in the membrane electrode assembly to be enhanced.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 1 is an enlarged cross-sectional view showing principal components of a membrane electrode assembly which is sandwiched between a first jig and a second jig;

FIG. 2 is a schematic system diagram of an activation device according to a first embodiment of the present invention;

DETAILED DESCRIPTION OF THE INVENTION

Figure 1:
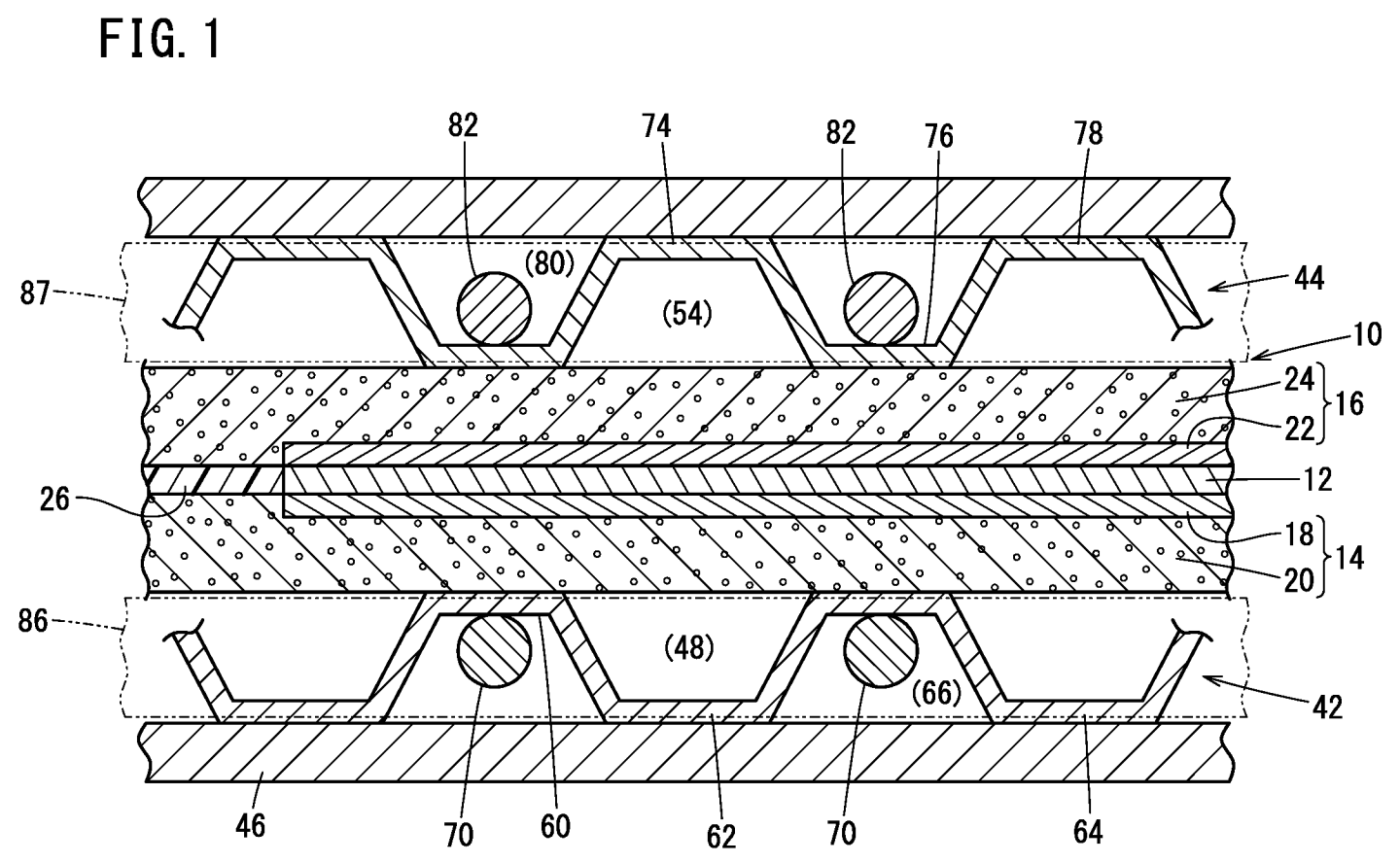
Figure 3:
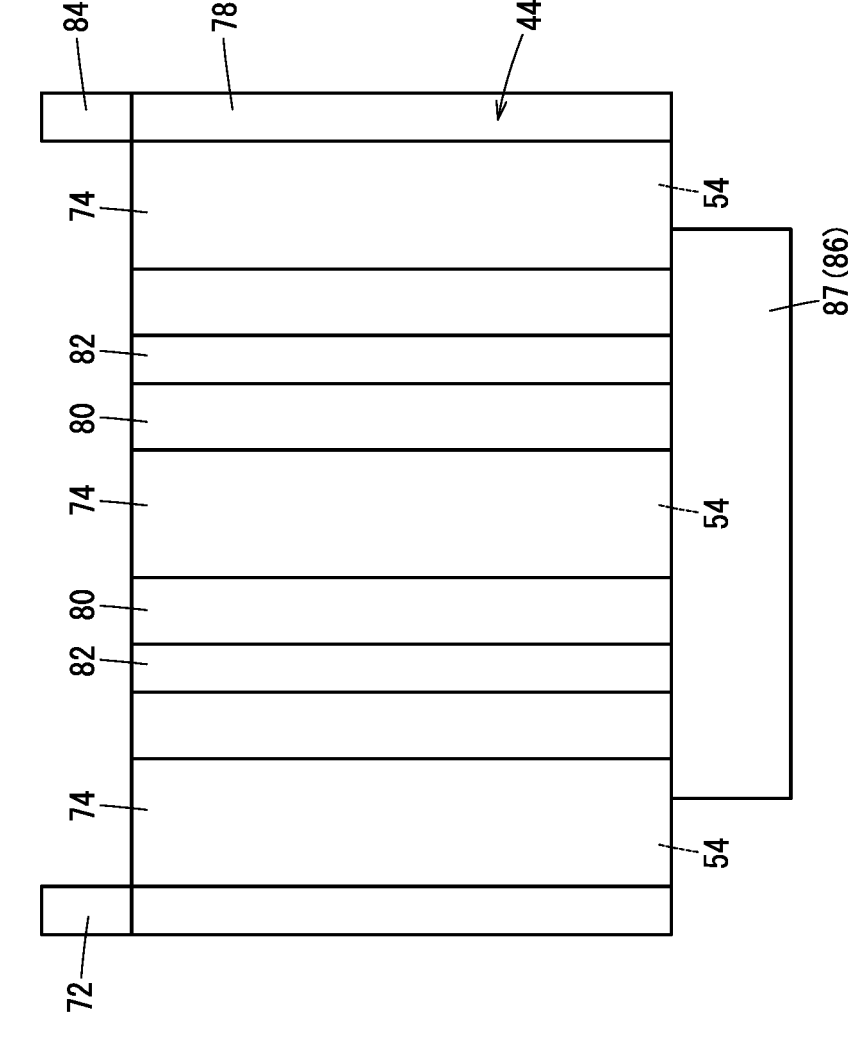
FIG. 3 is a schematic longitudinal cross-sectional view of the second jig.

Hereinafter, a membrane electrode assembly may be referred to as an "MEA". Initially, a brief description will be given concerning the MEA (membrane electrode assembly) 10 with reference to FIG. 1. The MEA 10 has an electrolyte membrane 12 made of a solid polymer. As the solid polymer, perfluorosulfonic acid or the like is exemplified.

The MEA 10 comprises an anode 14 and a cathode 16. The electrolyte membrane 12 is sandwiched between the anode 14 and the cathode 16. The anode 14 has a first electrode catalyst layer 18 containing an electrode catalyst, and a first gas diffusion layer 20 for supplying a gas to the first electrode catalyst layer 18. The cathode 16 has a second electrode catalyst layer 22 containing an electrode catalyst, and a second gas diffusion layer 24 for supplying a gas to the second electrode catalyst layer 22. In this case, the MEA 10 includes a resin frame member 26 made of a resin that retains the electrolyte membrane 12. However, the resin frame member 26 is not essential.

According to the present embodiment, the MEA 10 is not sandwiched between a pair of separators. More specifically, according to the present embodiment, activation is carried out on the MEA 10 instead of a unit cell.

Next, with reference to FIG. 2, a description will be given concerning an activation device 40 according to a first embodiment. The activation device 40 is equipped with a first jig 42, a second jig 44, and an accommodation case 46. The MEA 10 is sandwiched between the first jig 42 and the second jig 44. In this state, the MEA 10, the first jig 42, and the second jig 44 are accommodated in the accommodation case 46. The accommodation case 46 includes a first pipe 50 and a second pipe 52 in communication with an anode side flow path 48 (FIG. 1) of the first jig 42, and a third pipe 56 and a fourth pipe 58 in communication with a cathode side flow path 54 (FIG. 1) of the second jig 44. The interior of the accommodation case 46 is a closed space and is not open with respect to the atmosphere.

As shown in detail in FIG. 1, the first jig 42 includes a first corrugated portion 64 in which first convex portions 60 and first concave portions 62 are alternately and continuously connected. A recessed space, which is recessed with respect to the anode 14, is formed between each first concave portion 62 and the anode 14. The recessed spaces form the anode side flow path 48. A first wet gas that flows through the anode side flow path 48 comes into contact with the anode 14. A first convex space 66 that projects out toward the anode 14 is formed between each first convex portion 60 and the accommodation case 46. A first heat pipe 70 is disposed in the first convex space 66. As shown in FIG. 2 and FIG. 3, a first electrode terminal 72 is provided in the first jig 42.

In the same manner, the second jig 44 includes a second corrugated portion 78 in which second convex portions 74 and second concave portions 76 are alternately and continuously connected (FIG. 1). A recessed space, which is recessed with respect to the cathode 16, is formed between each second concave portion 76 and the cathode 16. The recessed spaces form the cathode side flow path 54. A second wet gas that flows through the cathode side flow path 54 comes into contact with the cathode 16. A second convex space 80 that projects out toward the cathode 16 is formed between each second convex portion 74 and the accommodation case 46. A second heat pipe 82 is disposed in the second convex space 80. As shown in FIG. 2 and FIG. 3, a second electrode terminal 84 is provided in the second jig 44.

Figure 2:
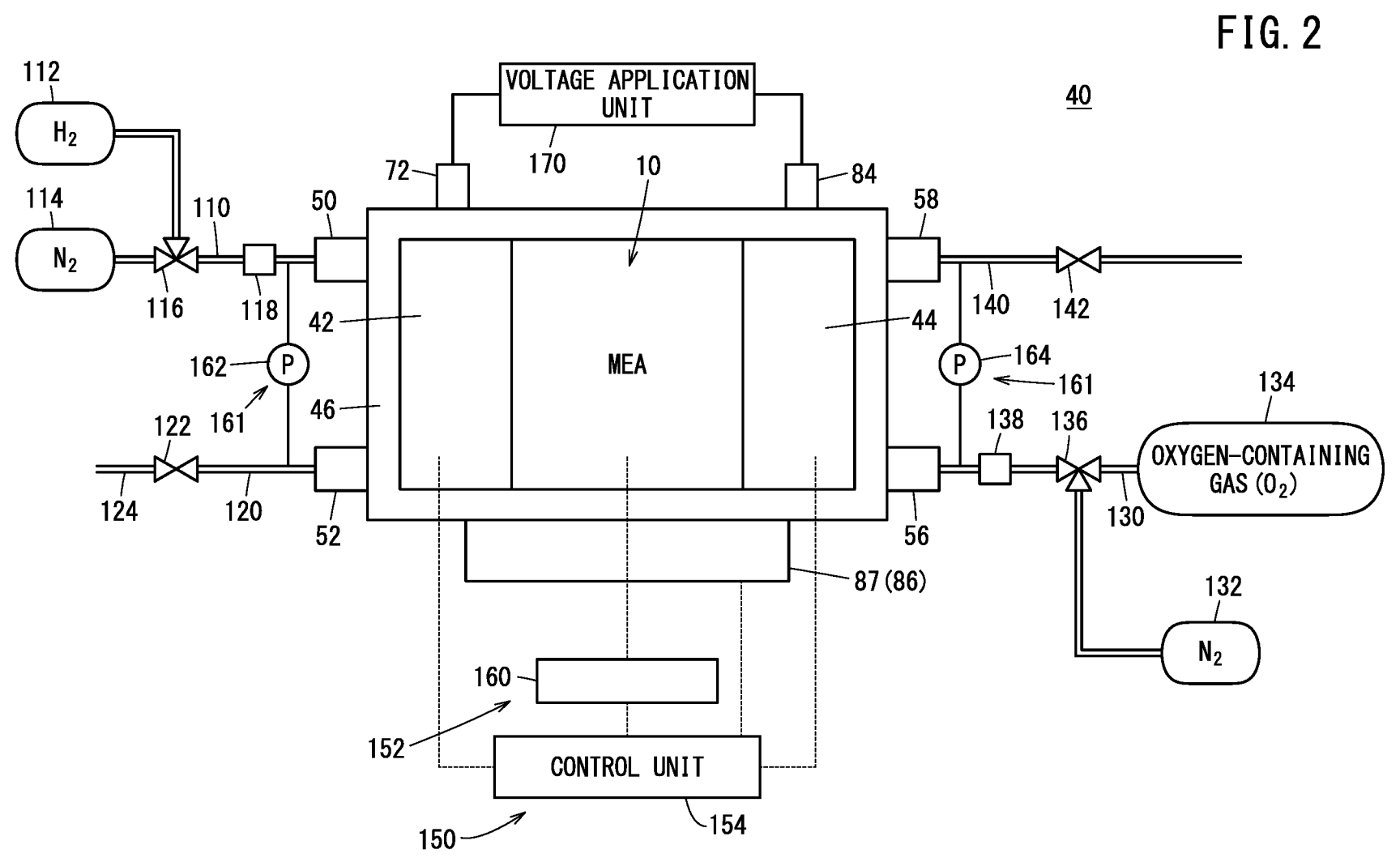
Figure 4:
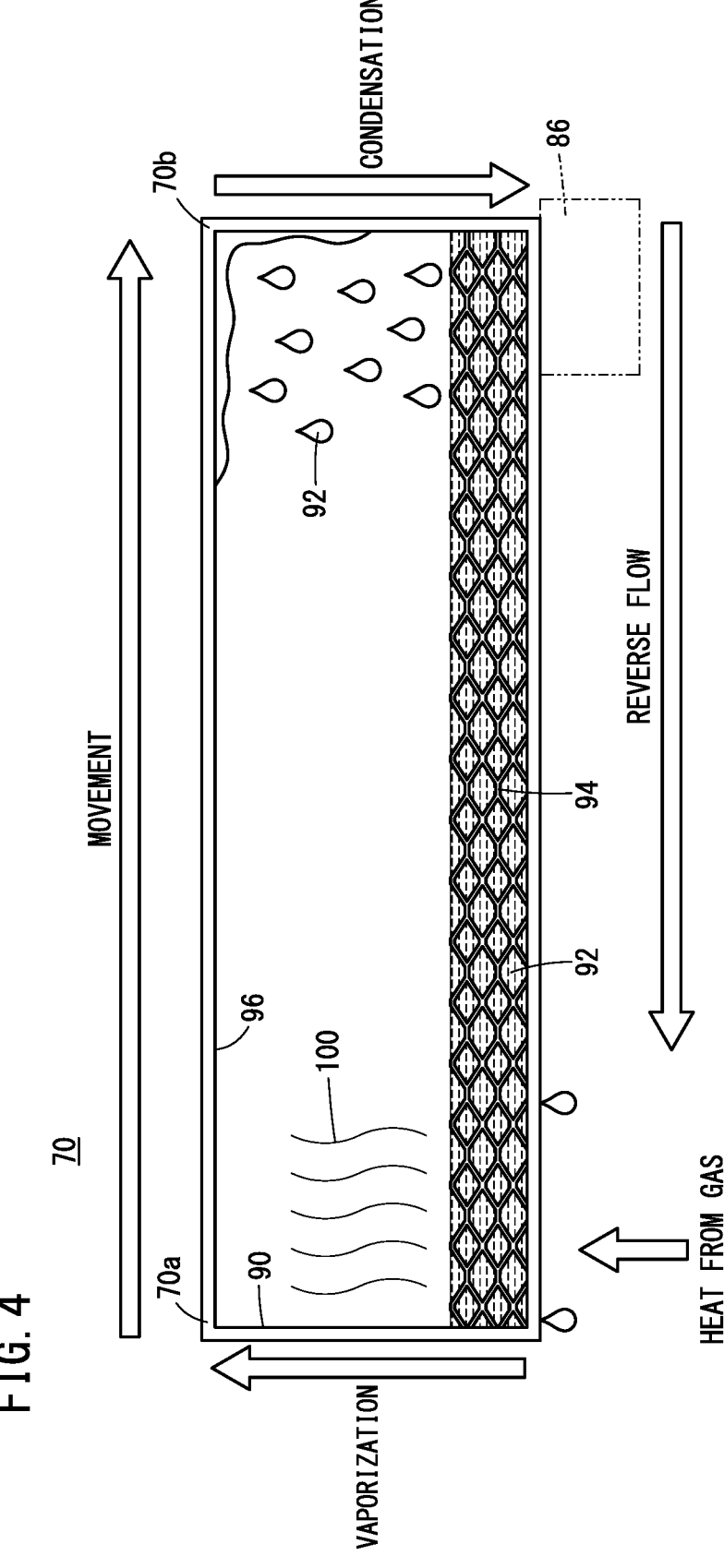
FIG. 4 is a schematic cross-sectional view of a first heat pipe.

As shown in FIGS. 1 to 3, a first cooling unit 86 and a second cooling unit 87 are provided in the accommodation case 46. The first cooling unit 86 and the second cooling unit 87 serve as a temperature adjustment unit, and constitute a liquid water amount adjustment unit. The first cooling unit 86 and the second cooling unit 87 are made up, for example, from Peltier elements or Thomson elements. The first cooling unit 86 takes heat away from the first heat pipe 70, whereas the second cooling unit 87 takes heat away from the second heat pipe 82. Herein, the configuration of the first heat pipe 70 and the second heat pipe 82 will briefly be described with reference to the first heat pipe 70 which is shown schematically in FIG. 4. As shown in FIG. 4, a closed space 90 is formed in the interior of the first heat pipe 70 along a longitudinal direction of the first heat pipe 70. A working fluid 92 that serves as a heat medium is accommodated in the closed space 90. The working fluid 92 is typically water, but may also be a liquid other than water. An appropriate amount of the working fluid 92 is enclosed within the closed space 90, and the closed space 90 is not filled to capacity.

A wick 94 is disposed in the interior of the first heat pipe 70 along the longitudinal direction. By partitioning the closed space 90 with the wick 94, a main passage 96 is formed therein.

In FIG. 4, a state is shown in which, heat is applied to a first end 70a of the first heat pipe 70, from the first wet gas. The working fluid 92 to which heat is applied from the first wet gas is vaporized into vapor 100. The vapor 100 travels along the main passage 96 from the relatively hot first end 70a toward a relatively cold second end 70b thereof. The heat of the vapor 100 is taken away by the first cooling unit 86 at the second end 70b. As a result, the vapor 100 condenses and returns to being the liquid phase working fluid 92. Due to a capillary force, the working fluid 92 passes through the interior of the wick 94 and returns to the first end 70a. Stated otherwise, a reflux or a reverse flow occurs.

The second heat pipe 82 is constituted in a similar manner to the first heat pipe 70. In the interior of the second heat pipe 82 as well, the working fluid 92 or the vapor 100 moves in a similar manner to the working fluid 92 or the vapor 100 in the first heat pipe 70.

As shown in FIG. 2, the activation device 40 comprises a first gas supply line 110. A hydrogen gas supply unit 112 and a nitrogen gas supply unit 114 are connected to one end of the first gas supply line 110 via a first three-way valve 116. The hydrogen gas supply unit 112, for example, is a hydrogen gas tank. The nitrogen gas supply unit 114, for example, is a nitrogen gas tank. In the first embodiment, the nitrogen gas is used as an inert first gas. The hydrogen gas is used as a first gas for the purpose of activation. In this manner, the hydrogen gas supply unit 112 and the nitrogen gas supply unit 114 serve as first gas supplying units. The hydrogen gas or the nitrogen gas is selectively supplied as the first gas.

A first humidification unit 118 is disposed in the first gas supply line 110. The first humidification unit 118 adds water vapor to the first gas (the hydrogen gas or the nitrogen gas). Consequently, the first gas becomes a wet gas. Hereinafter, for the sake of convenience, the first gas to which water vapor has been added is referred to as a first wet gas.

The other end of the first gas supply line 110 is connected to the first pipe 50 of the accommodation case 46. The first wet gas (the wet hydrogen gas or the wet nitrogen gas) that has flowed into the first pipe 50 from the other end of the first gas supply line 110 flows through the anode side flow path 48 that is formed in the first jig 42.

The activation device 40 comprises a first gas discharge line 120. One end of the first gas discharge line 120 is connected to the second pipe 52 of the accommodation case 46. A first discharge line 124 is provided at the other end of the first gas discharge line 120 via a first discharge valve 122. The first wet gas that has flowed through the anode side flow path 48 passes through the second pipe 52 of the accommodation case 46, the first gas discharge line 120, and the first discharge valve 122, and is discharged from the first discharge line 124. Alternatively, a non-illustrated recovery device may be provided in the first discharge line 124, and may recover the first wet gas.

The activation device 40 comprises a second gas supply line 130. A nitrogen gas supply unit 132 and an oxygen-containing gas supply unit 134 are connected to one end of the second gas supply line 130 via a second three-way valve 136. The nitrogen gas supply unit 132, for example, in the same manner as described above, is a nitrogen gas tank. The nitrogen gas is supplied as an inert second gas. According to the first embodiment, the nitrogen gas supply unit 114 which is connected to the first gas supply line 110 and the nitrogen gas supply unit 132 which is connected to the second gas supply line 130 are separately provided. However, one nitrogen gas supply unit may be connected to both of the first gas supply line 110 and the second gas supply line 130.

The oxygen-containing gas supply unit 134, for example, is a compressor that compresses the atmosphere. Alternatively, the oxygen-containing gas supply unit 134 may be an oxygen gas cylinder. The oxygen-containing gas is used as a second gas in order to generate electricity. In this manner, the nitrogen gas supply unit 132 and the oxygen-containing gas supply unit 134 serve as second gas supplying units. The nitrogen gas or the oxygen-containing gas is selectively supplied as the second gas.

A second humidification unit 138 is disposed in the second gas supply line 130. The second humidification unit 138 adds water vapor to the second gas (the nitrogen gas or the oxygen-containing gas). Consequently, the second gas becomes a wet gas (a wet nitrogen gas or a wet oxygen-containing gas). Hereinafter, for the sake of convenience, the second gas to which water vapor has been added is referred to as a second wet gas.

The other end of the second gas supply line 130 is connected to the third pipe 56 of the accommodation case 46. The second wet gas that has flowed into the third pipe 56 from the other end of the second gas supply line 130 flows through the cathode side flow path 54 that is formed in the second jig 44.

The activation device 40 comprises a second gas discharge line 140. One end of the second gas discharge line 140 is connected to the fourth pipe 58 of the accommodation case 46. A second discharge valve 142 is provided at the other end of the second gas discharge line 140. The second wet gas that has flowed through the cathode side flow path 54 passes through the fourth pipe 58 of the accommodation case 46 and the second discharge valve 142, and is discharge to the exterior of the second gas discharge line 140. Alternatively, a non-illustrated recovery device may be provided in the second gas discharge line 140, and may recover the second wet gas.

The activation device 40 includes a humidification state acquisition unit 150 that constitutes the liquid water amount adjustment unit. According to the first embodiment, the humidification state acquisition unit 150 includes an electrical parameter detection unit 152 and a control unit 154. The electrical parameter detection unit 152, for example, includes the first electrode terminal 72, the second electrode terminal 84, and an MEA voltage meter 160. Hereinafter, for the sake of convenience, a generated electrical voltage of the MEA 10 obtained by the MEA voltage meter 160 will be referred to as a cell voltage. The cell voltage is obtained on the basis of a potential difference between the anode 14 and the cathode 16. Moreover, the electrical parameter detection unit 152 may be an MEA resistance meter, an MEA current meter, or an MEA impedance meter. The electrical parameter detection unit 152 may include all of these measurement instruments.

The humidification state acquisition unit 150 further comprises a pressure parameter detection unit 161. The pressure parameter detection unit 161 includes an anode differential pressure gauge 162, and a cathode differential pressure gauge 164.

The anode differential pressure gauge 162 detects a differential pressure between the gas pressure of the first gas supply line 110 and the gas pressure of the first gas discharge line 120. More specifically, such a differential pressure represents a differential pressure between an inlet to the anode 14 in the anode side flow path 48, and an outlet from the anode 14 in the anode side flow path 48. The cathode differential pressure gauge 164 detects a differential pressure between the gas pressure of the second gas supply line 130 and the gas pressure of the second gas discharge line 140. More specifically, such a differential pressure represents a differential pressure between an inlet to the cathode 16 in the cathode side flow path 54, and an outlet from the cathode 16 in the cathode side flow path 54.

The control unit 154 is electrically connected to the first cooling unit 86, the second cooling unit 87, the MEA voltage meter 160, the anode differential pressure gauge 162, and the cathode differential pressure gauge 164. Information concerning the cell voltage measured by the MEA voltage meter 160 (the electrical parameter detection unit 152) is transmitted as an information signal to the control unit 154. Information signals concerning the gas differential pressures measured by the anode differential pressure gauge 162 and the cathode differential pressure gauge 164 are also input to the control unit 154.

As will be discussed later, according to the first embodiment, a CV aging process in which a variable voltage is applied is initially performed. For this purpose, a voltage application unit 170 is electrically connected to the MEA 10 via the first jig 42 and the second jig 44.

Figure 5:
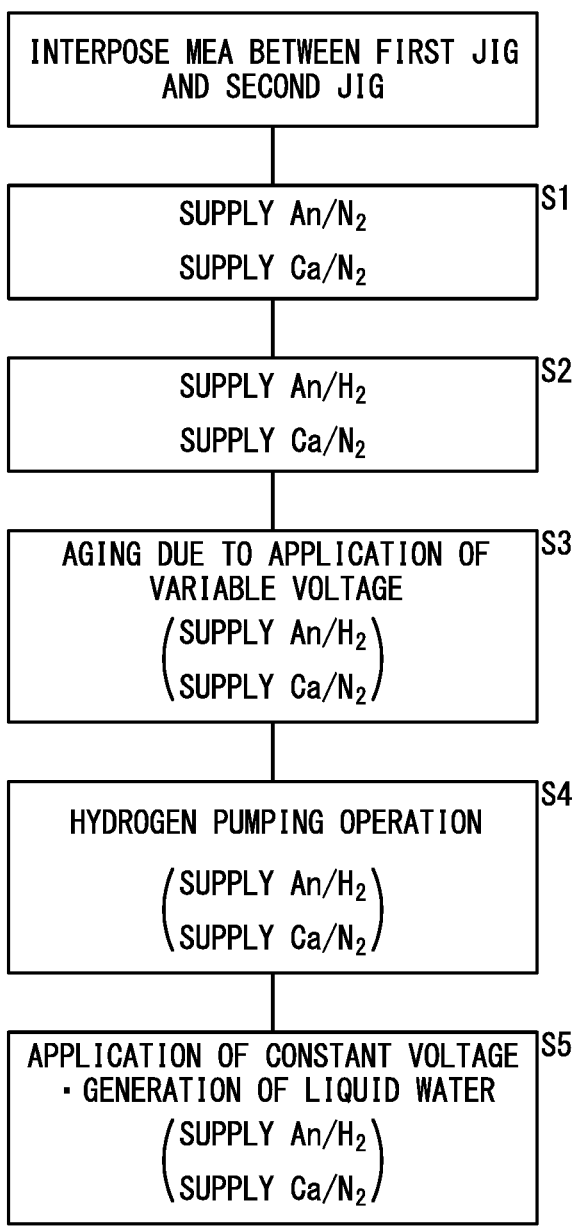
FIG. 5 is a schematic process flow diagram of an activation method according to a first embodiment of the present invention.

Next, a description will be given concerning an activation method according to the first embodiment. FIG. 5 is a schematic process flow diagram of the activation method according to the first embodiment. The activation method includes a scavenging step S1, a gas supplying step S2, an aging step S3, a hydrogen pumping operation step S4, and a voltage application step S5. It should be noted that "An" in FIG. 5 indicates the anode 14, and "Ca" in FIG. 5 indicates the cathode 16. The same features apply to FIG. 6, FIG. 8, and FIG. 9.

Initially, an operator sandwiches the MEA 10 prior to being assembled into a unit cell, between the first jig 42 and the second jig 44. Next, the MEA 10, the first jig 42, and the second jig 44 are accommodated in the accommodation case 46. In this instance, the first pipe 50, the second pipe 52, the third pipe 56, and the fourth pipe 58 of the accommodation case 46 are connected respectively beforehand to the first gas supply line 110, the first gas discharge line 120, the second gas supply line 130, and the second gas discharge line 140. Further, the first electrode terminal 72 of the first jig 42, and the second electrode terminal 84 of the second jig 44 are electrically connected to the voltage application unit 170. Although not particularly shown in FIG. 2, the MEA voltage meter 160 is also electrically connected to the first electrode terminal 72 and the second electrode terminal 84.

In this state, the operator issues, to the control unit 154, a command signal to "initiate activation". Based on the command signal, the control unit 154 initially executes the scavenging step S1.

In order to carry out the scavenging step S1, the control unit 154 to which the command signal has been input causes the first three-way valve 116 to be operated in a direction in which the nitrogen gas supply unit 114 is placed in communication with the first gas supply line 110. In addition, the control unit 154 causes the second three-way valve 136 to be operated in a direction in which the nitrogen gas supply unit 132 is placed in communication with the second gas supply line 130. Further, the control unit 154 opens the first discharge valve 122 and the second discharge valve 142.

The nitrogen gas supplied from the nitrogen gas supply unit 114 passes through the first humidification unit 118, and after having become a wet nitrogen gas, flows through the first gas supply line 110. The wet nitrogen gas passes through the first pipe 50 and flows into the anode side flow path 48 of the first jig 42. The wet nitrogen gas, while flowing through the anode side flow path 48, comes into contact with the first electrode catalyst layer 18 of the anode 14. Consequently, moisture is imparted to the anode 14 and the electrolyte membrane 12. The wet nitrogen gas that has flowed through the anode side flow path 48 passes through the second pipe 52 and flows into the first gas discharge line 120. Thereafter, the wet nitrogen gas passes through the first discharge valve 122 and is discharged from the first discharge line 124.

The nitrogen gas supplied from the nitrogen gas supply unit 132 passes through the second humidification unit 138, and after having become a wet nitrogen gas, flows through the second gas supply line 130. The wet nitrogen gas passes through the third pipe 56 and flows into the cathode side flow path 54 of the second jig 44. The wet nitrogen gas, while flowing through the cathode side flow path 54, comes into contact with the second electrode catalyst layer 22 of the cathode 16. Consequently, moisture is imparted to the cathode 16 and the electrolyte membrane 12. The wet nitrogen gas that has flowed through the cathode side flow path 54 passes through the fourth pipe 58 and flows into the second gas discharge line 140. Thereafter, the wet nitrogen gas passes through the second discharge valve 142 and is discharged to the exterior of the second gas discharge line 140.

As noted previously, the air is discharged from the anode side flow path 48 and the cathode side flow path 54 and is replaced with wet nitrogen gas. When the control unit 154 recognizes that a predetermined time period has elapsed since the scavenging step S1 was started, the process transitions to the gas supplying step S2. Specifically, the control unit 154 causes the first three-way valve 116 to be operated in a direction in which the hydrogen gas supply unit 112 is made to communicate with the first gas supply line 110.

The hydrogen gas supplied from the hydrogen gas supply unit 112 passes through the first humidification unit 118, and after having become a wet hydrogen gas, flows through the first gas supply line 110. The wet hydrogen gas passes through the first pipe 50 and flows into the anode side flow path 48 of the first jig 42. The wet hydrogen gas, while flowing through the anode side flow path 48, comes into contact with the first electrode catalyst layer 18 of the anode 14. Consequently, the application of moisture to the anode 14 and the electrolyte membrane 12 is continued. The wet hydrogen gas that has flowed through the anode side flow path 48 passes through the second pipe 52 and flows into the first gas discharge line 120. Thereafter, the wet hydrogen gas passes through the first discharge valve 122 and is discharged from the first discharge line 124. Such a wet hydrogen gas may be recovered by a non-illustrated recovery mechanism.

In the gas supplying step S2, a vapor (a gas/liquid two-phase flow) in which cavitation by an ultrasonic injection nozzle is contained may be injected respectively into the first gas supply line 110 and the second gas supply line 130. In this case, the first electrode catalyst layer 18 and the second electrode catalyst layer 22 are satisfactorily moistened by vapor. More specifically, the moistened state of the first electrode catalyst layer 18 and the second electrode catalyst layer 22 is improved.

When the control unit 154 recognizes that a predetermined time period has elapsed since the gas supplying step S2 was started, the process transitions to the aging step S3. Specifically, the control unit 154 applies a variable voltage from the voltage application unit 170 to the MEA 10. The applied voltage, for example, is repeatedly varied between a predetermined lower limit voltage and 0.9 V. The predetermined lower limit voltage is typically a value within the range of 0 V to less than 0.1 V. In the aging step S3, the toxic substances are stripped off from the electrode catalyst of the first electrode catalyst layer 18. Similarly, the toxic substances are stripped off from the electrode catalyst of the second electrode catalyst layer 22.

When the control unit 154 recognizes that a predetermined time period has elapsed since the aging step S3 was started, the process transitions to the hydrogen pumping operation step S4. Specifically, the control unit 154 causes the polarity of the voltage applied to the MEA 10 from the voltage application unit 170 to be inverted. Consequently, with respect to the MEA 10, a voltage is applied in which the anode 14 is made positive and the cathode 16 is made negative. As a result, the current flows from the cathode 16 toward the anode 14. Moreover, the applied voltage is of a constant value. The applied voltage, for example, is set to the lower limit value of the variable voltage in the aging step S3.

Along therewith, a reaction occurs in the first electrode catalyst layer 18 in which the hydrogen is ionized into protons and electrons. The protons move to the second electrode catalyst layer 22 through the electrolyte membrane 12. On the other hand, the electrons move from the anode 14 to the cathode 16 via the voltage application unit 170. In the second electrode catalyst layer 22, the protons and the electrons which have undergone movement in this manner are recombined, and thereby generate hydrogen. The hydrogen is discharged from the second gas discharge line 140. Simultaneously, the electrolyte membrane 12 is humidified by the water vapor contained in the wet hydrogen gas.

Figure 6:
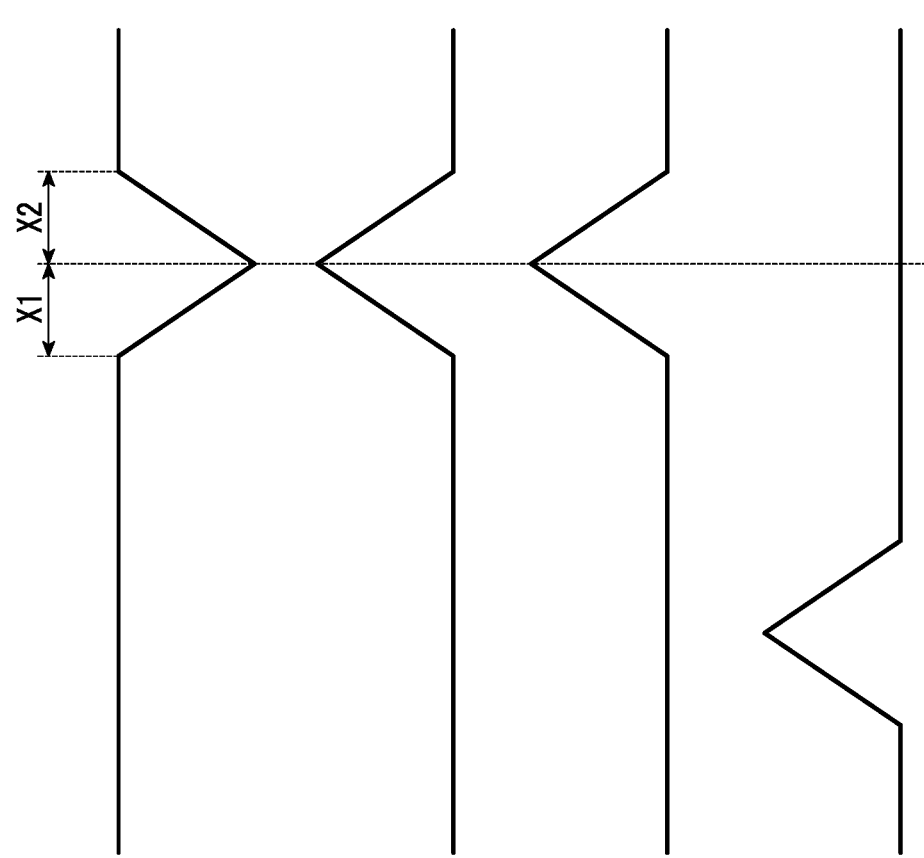
FIG. 6 is a graph showing a change in a temperature of a second heat pipe, a change in an amount of liquid water in a cathode side flow path, a change in a differential pressure on a side of the cathode, and a change in an applied voltage.

When the control unit 154 recognizes that a predetermined time period has elapsed since the hydrogen pumping operation step S4 was started, the process transitions to the voltage application step S5. The applied voltage is of a constant value. The applied voltage, for example, is set to the same value as the applied voltage in the hydrogen pumping operation step S4. The graph D in FIG. 6 shows changes in voltage that take place in the aging step S3, the hydrogen pumping operation step S4, and the voltage application step S5.

Heat is generated in the MEA 10 to which the voltage is applied, and when such heat is transferred to the wet hydrogen gas and the wet nitrogen gas, the temperature of the wet hydrogen gas and the wet nitrogen gas increases. At this time, the first heat pipe 70 captures heat from the wet hydrogen gas. Similarly, the second heat pipe 82 captures heat from the wet nitrogen gas. In this manner, the first heat pipe 70 and the second heat pipe 82 cool the wet hydrogen gas and the wet nitrogen gas, respectively. Along with such cooling, the working fluid 92 becomes the vapor 100 (refer to FIG. 4). The vapor 100 moves toward the first cooling unit 86 or the second cooling unit 87. Thereafter, the vapor 100 is deprived of heat by the first cooling unit 86 or the second cooling unit 87, and the vapor returns to being the working fluid 92.

The control unit 154 is capable of controlling the degree of cooling performed by the first cooling unit 86 and the second cooling unit 87. In accordance with this feature, the temperature of the working fluid 92 in the first heat pipe 70 or the second heat pipe 82 is raised or lowered. For example, in the case that the degree of cooling by the second cooling unit 87 is increased, the temperature of the working fluid 92 in the second heat pipe 82 becomes lower, as indicated by the region X1 in the graph A shown in FIG. 6. Moreover, in FIG. 6, for the sake of convenience, the temperature of the working fluid 92 is expressed as a "temperature of the second heat pipe".

In this case, the amount of heat captured from the wet nitrogen gas by the second heat pipe 82 becomes increased. Therefore, since the temperature inside the cathode side flow path 54 decreases, the dew point inside the cathode side flow path 54 drops. As a result, as shown in the region X1 in the graph B shown in FIG. 6, the amount of the liquid water produced due to dew condensation becomes greater in the cathode side flow path 54. Moreover, condensed water is generated by condensation of the water vapor contained within the wet nitrogen gas. Further, as shown in the region X1 in the graph C shown in FIG. 6, the differential pressure detected by the cathode differential pressure gauge 164 rises.

As the amount of the liquid water increases in the cathode side flow path 54, the moisture content of the MEA 10 increases. Accordingly, in the aging step S3, the toxic substances which are stripped away from the electrode catalyst are eluted into the liquid water. Stated otherwise, the anode 14 or the cathode 16 is capable of being cleaned.

If the increased degree of cooling by the second cooling unit 87 is maintained thereafter, the amount of the liquid water in the cathode side flow path 54 becomes excessive. Thus, contrary to what was described previously, the control unit 154 decreases the degree of cooling by the second cooling unit 87. As a result, the temperature of the working fluid 92 in the second heat pipe 82 rises, as indicated by the region X2 in the graph A shown in FIG. 6. Therefore, since the temperature inside the cathode side flow path 54 increases, the dew point inside the cathode side flow path 54 rises. As a result, as shown in the region X2 in the graph B shown in FIG. 6, the amount of the liquid water produced due to dew condensation becomes smaller in the cathode side flow path 54. Further, as shown in the region X2 in the graph C shown in FIG. 6, the differential pressure detected by the cathode differential pressure gauge 164 drops. Moreover, during the adjustment of the dew point as well, application of the constant voltage is maintained, as shown in the graph D in FIG. 6.

In this manner, while on the one hand the amount of the liquid water in the cathode side flow path 54 is reduced, the liquid water in which the toxic substances have been eluted flows out to the exterior of the accommodation case 46 via the first gas discharge line 120 and the second gas discharge line 140. Therefore, re-adsorption of the toxic substances to the anode 14 or the cathode 16 is suppressed. Further, since the amount of the liquid water is reduced, the degree of wetting of the MEA 10 returns to a degree suitable for CV aging.

In the first heat pipe 70 and the second heat pipe 82, the response speed with respect to the amount of the input heat is high. Therefore, the amount of the liquid water in the cathode side flow path 54 is capable of being made to change in a relatively short period of time. More specifically, according to the first embodiment, it is easy to control the amount of the liquid water.

Alternatively, the degree of cooling by the first cooling unit 86 may be adjusted. In the case that the degree of cooling by the first cooling unit 86 is increased, the temperature of the working fluid 92 inside the first heat pipe 70 becomes lower, as in the region X1 in the graph A shown in FIG. 6. In this case, the amount of heat captured from the wet hydrogen gas by the first heat pipe 70 becomes increased. Therefore, as in the region X1 shown in the graph B, since the temperature inside the anode side flow path 48 is lowered, the dew point inside the anode side flow path 48 drops. As a result, the amount of the liquid water generated due to condensation increases in the anode side flow path 48. Moreover, condensed water is generated by condensation of the water vapor contained within the wet hydrogen gas.

As the amount of the liquid water increases in the anode side flow path 48, the moisture content (water content) of the MEA 10 increases. Accordingly, in the same manner as stated previously, in the aging step S3, the toxic substances which are stripped away from the electrode catalyst are eluted into the liquid water. Stated otherwise, the anode 14 or the cathode 16 is capable of being cleaned.

Thereafter, in the same manner as was described previously, the control unit 154 decreases the degree of cooling by the first cooling unit 86. Consequently, the amount of the liquid water generated due to condensation becomes smaller in the anode side flow path 48. In this manner, while on the one hand the amount of the liquid water in the anode side flow path 48 is reduced, the liquid water in which the toxic substances have been eluted is discharged out to the exterior of the accommodation case 46 via the first gas discharge line 120 and the second gas discharge line 140. Accordingly, even in this case, re-adsorption of the toxic substances to the anode 14 or the cathode 16 is suppressed. Further, since the amount of the liquid water is reduced, the degree of wetting of the MEA 10 returns to a degree suitable for CV aging.

After having recognized that the predetermined time period has elapsed since the voltage application step S5 was started, the control unit 154 returns to the aging step S3. At the time of having returned to the aging step S3, the control unit 154 first causes the polarity of the voltage applied to the MEA 10 from the voltage application unit 170 to be inverted from the state of the voltage applying step S5. Consequently, with respect to the MEA 10, a voltage is applied in which the anode 14 is made negative and the cathode 16 is made positive. Further, the voltage applied to the MEA 10 from the voltage application unit 170 is varied. Thereafter, the hydrogen pumping operation step S4 and the voltage application step S5 are executed in the same manner as described previously. In the case that the aging step S3, the hydrogen pumping operation step S4, and the voltage application step S5 are regarded as one cycle, the aging step S3, the hydrogen pumping operation step S4, and the voltage application step S5 are repeated until a predetermined number of cycles is performed.

In the voltage application step S5, due to a synergistic effect of cleaning of the electrolyte membrane 12 by operating the hydrogen pump while the voltage being applied, and a liquid water control by the first heat pipe 70, the cleaning and draining performance of the toxic substances is significantly improved. Moreover, in the case that the hydrogen pumping operation step S4 is not carried out, although the effect of the hydrogen pumping operation is not obtained, it is possible to clean the toxic substances, and to discharge the stripped toxic substances together with the liquid water. The voltage application step S5 may be carried out immediately after either one of the aging step S3 or the hydrogen pumping operation step S4.

After having completed a predetermined number of cycles, the control unit 154 controls the first three-way valve 116. Consequently, the communication between the hydrogen gas supply unit 112 and the first gas supply line 110 is interrupted, and the nitrogen gas supply unit 114 and the first gas supply line 110 are placed in communication.

In this state, the nitrogen gas is supplied from the nitrogen gas supply unit 114 to the anode side flow path 48. The nitrogen gas becomes a wet nitrogen gas by passing through the same flow path as the nitrogen gas flow path in the scavenging step S1, and the wet nitrogen gas is supplied to the anode 14. The wet nitrogen gas passes through the first gas discharge line 120, and is discharged from the first discharge valve 122. During this period, the wet nitrogen gas is continuously supplied to the cathode side flow path 54.

After the interior of the anode side flow path 48 has been replaced with the wet nitrogen gas, the first three-way valve 116, the second three-way valve 136, the first discharge valve 122, and the second discharge valve 142 are closed. Thereafter, the MEA 10 is disconnected from the activation device 40.

A unit cell is obtained by sandwiching the MEA 10 between one pair of separators. The fuel cell stack is obtained by stacking a predetermined number of the unit cells.

There are cases where, after having stacked the unit cells and obtained the fuel cell stack, activation of the fuel cell stack may be implemented. In these cases, if a predetermined electrical power generation performance cannot be obtained when a power generation test is carried out after the activation, then it is necessary to disassemble the fuel cell stack, and then to reassemble the fuel cell stack after having removed a defective unit cell.

In contrast thereto, according to the first embodiment, the MEA 10 which is determined to have been sufficiently activated is used, and the unit cell and the fuel cell stack can be assembled. In this case, a situation is avoided in which a unit cell that has not been sufficiently activated is incorporated into the fuel cell stack. Therefore, in a large number of such cases, the fuel cell stack exhibits the predetermined power generation performance. Accordingly, there is almost no need to disassemble the fuel cell stack and to remove a defective unit cell. Further, there is almost no need to reassemble the fuel cell stack.

Figure 7:
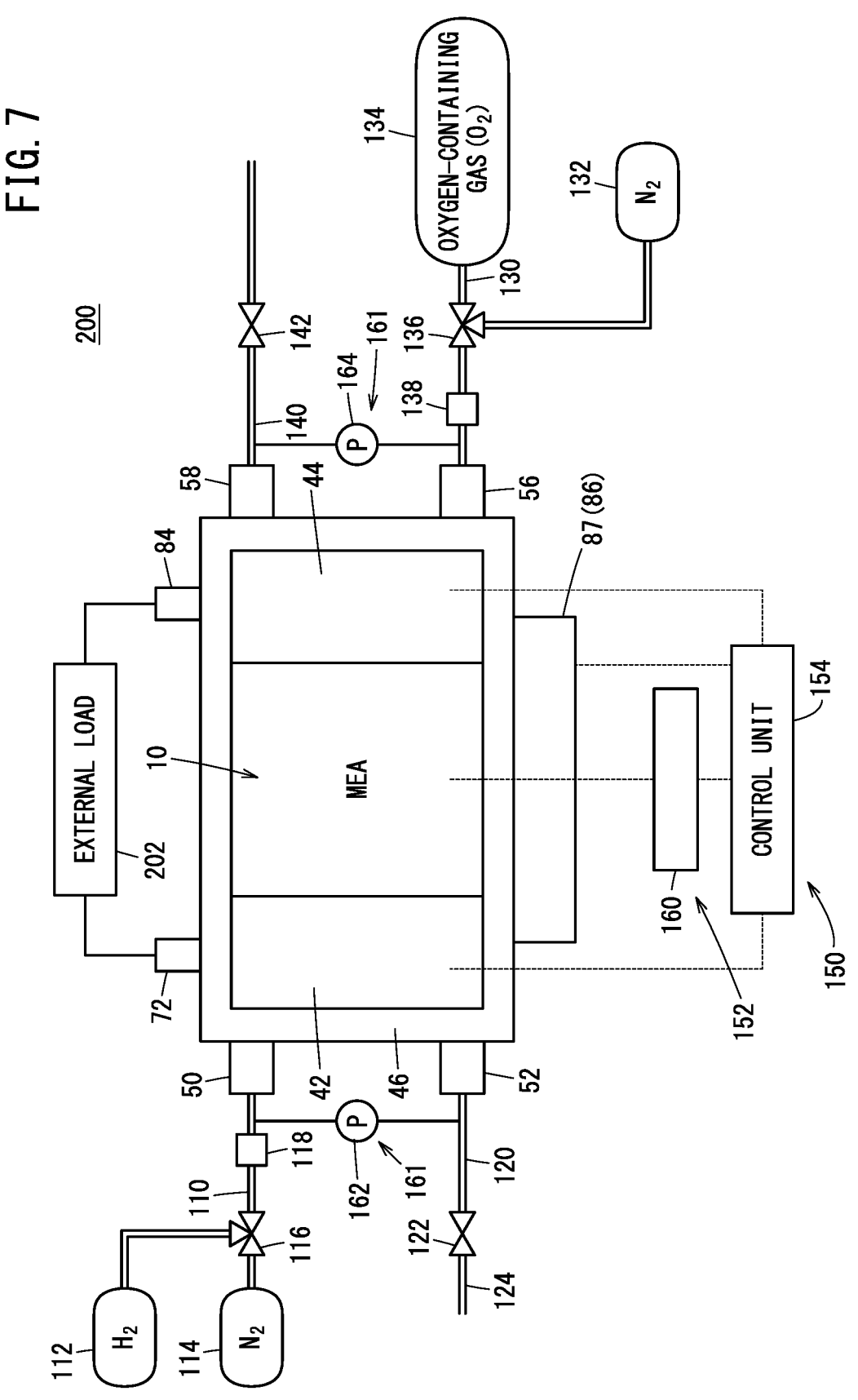
FIG. 7 is a schematic system diagram of an activation device according to a second embodiment of the present invention.

Next, with reference to FIG. 7, a description will be given concerning an activation device 200 according to a second embodiment. Moreover, it should be noted that the same reference numerals designate the same constituent elements as those shown in FIGS. 1 to 4, and detailed description of these elements will be omitted.

In the activation device 200, an external load 202 is used instead of the voltage application unit 170 in the activation device 40 (refer to FIG. 2). Stated otherwise, the activation device 200 is constituted to include the external load 202.

According to the second embodiment, the MEA voltage meter 160 measures the potential difference between the anode 14 and the cathode 16 in the MEA 10 during the generation of electricity. Such a potential difference is the generated electrical voltage of the MEA 10. Hereinafter, this generated electrical voltage will be referred to as a cell voltage for the sake of convenience. The lower limit value and the upper limit value of the cell voltage are input as threshold values to the control unit 154.

Figure 8:
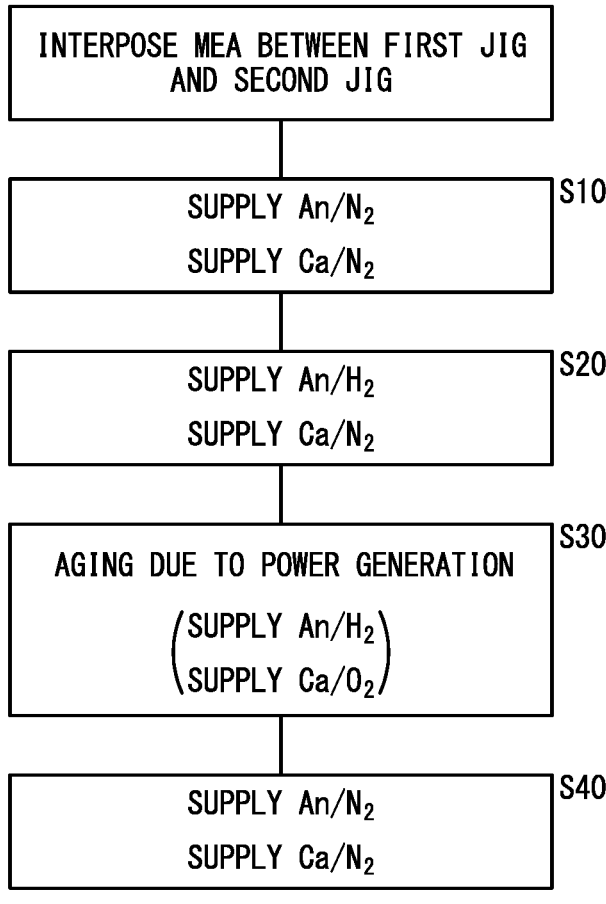
FIG. 8 is a schematic process flow diagram of an activation method according to the second embodiment of the present invention.

With reference to the schematic process flow diagram shown in FIG. 8, a description will be given concerning the activation method according to the second embodiment. The activation method according to the second embodiment includes a scavenging step S10, a gas supplying step S20, an electrical power generation step S30, and a re-scavenging step S40. In the scavenging step S10, replacement of the gas in the same manner as in the scavenging step S1 described in the first embodiment is performed. In the gas supplying step S20, the wet hydrogen gas is supplied to the anode side flow path 48 in the same manner as in the gas supplying step S2 described in the first embodiment.

When the control unit 154 recognizes that a predetermined time period has elapsed since the gas supplying step S20 was started, the process transitions to the electrical power generation step S30. According to the second embodiment, the control unit 154 operates the second three-way valve 136 and thereby interrupts the communication between the nitrogen gas supply unit 132 and the second gas supply line 130, and in addition, places the oxygen-containing gas supply unit 134 and the second gas supply line 130 in communication. Consequently, the oxygen-containing gas (typically compressed air) containing an oxygen gas flows into the second gas supply line 130. The oxygen-containing gas passes through the second humidification unit 138, and after having become a wet oxygen-containing gas, flows through the third pipe 56 into the cathode side flow path 54 of the second jig 44. The wet oxygen-containing gas, while flowing through the cathode side flow path 54, comes into contact with the second electrode catalyst layer 22 of the cathode 16. Consequently, the application of moisture to the cathode 16 and the electrolyte membrane 12 is continued. The wet oxygen-containing gas that has flowed through the cathode side flow path 54 passes through the fourth pipe 58 and flows into the second gas discharge line 140. Thereafter, the wet oxygen-containing gas passes through the second discharge valve 142 and is discharged to the exterior of the second gas discharge line 140.

In this case, in the first electrode catalyst layer 18 of the anode 14, the hydrogen is ionized and thereby generates protons and electrons. The protons undergo conduction within the electrolyte membrane 12, and reach the second electrode catalyst layer 22 of the cathode 16. The electrons reach the second electrode catalyst layer 22 of the cathode 16 via the external load 202. In the second electrode catalyst layer 22, the oxygen, the protons, and the electrons chemically combine, and thereby produce water.

The electrochemical reactions described above are exothermic reactions. Stated otherwise, the MEA 10 is heated. When the heat is transferred to the wet hydrogen gas and the wet oxygen-containing gas, the temperatures of the wet hydrogen gas and the wet oxygen-containing gas rise. At this time, the first heat pipe 70 captures heat from the wet hydrogen gas. Similarly, the second heat pipe 82 captures heat from the wet oxygen-containing gas. In this manner, the first heat pipe 70 and the second heat pipe 82 cool the wet hydrogen gas and the wet oxygen-containing gas, respectively.

Accompanying the progression of the electrochemical reactions (power generation), the toxic substances are stripped off from each of the electrode catalysts of the first electrode catalyst layer 18 and the second electrode catalyst layer 22. Consequently, the active surfaces of the electrode catalysts are exposed. The toxic substances which are stripped from the electrode catalysts are primarily discharged together with the water produced by the generation of electricity, from the anode side flow path 48 and the cathode side flow path 54. Accordingly, re-adsorption of impurities to the electrode catalyst is suppressed.

At the time when power generation is performed, the value of the current (or the current density) extracted from the MEA 10 to the external load 202 is varied. Hereinafter, such a current will be referred to as a load current. Accompanying the load current being varied, the cell voltage varies as indicated by the graph E shown in FIG. 9. For example, the cell voltage becomes low when the load current is large, and the cell voltage becomes high when the load current is small. In the case that the cell voltage is varied in this manner, an oxidation reduction reaction on the surface of the electrode catalyst is promoted more so than in the electrical power generation aging process in which the cell voltage is kept constant.

When the toxic substances are stripped from the electrode catalyst, since the active surface area of the electrode catalyst increases, the overpotential in the MEA 10 decreases. Hereinafter, for the sake of convenience, such an overpotential will be referred to as a "cell activation overpotential". Further, when the amount of the liquid water generated by the power generation increases, since the water content ratio of the MEA 10 increases, the wet reactant gas does not easily arrive at the first electrode catalyst layer 18 and the second electrode catalyst layer 22. Based on such a condition, the overpotential at the MEA 10 increases. For the sake of convenience, such an overpotential will be referred to as a "cell concentration overpotential". The cell activation overpotential and the cell concentration overpotential are components that inhibit the cell voltage, and when the overpotential becomes lower, the cell voltage becomes higher.

As aging due to the power generation progresses, as described above, the cell activation overpotential decreases and the cell voltage rises accordingly. Therefore, even if the load current is made large, it is not easy to cause the cell voltage to be sufficiently lowered. For the same reason, even if the flow rate of the wet reactant gas supplied to the MEA 10, or the compounding ratio or the gas type is changed, it is not easy to cause the cell voltage to be sufficiently lowered. As a result, the aging efficiency decreases. To avoid this condition, in the power generation step S30, the cell concentration overpotential is made to increase.

Figure 9:
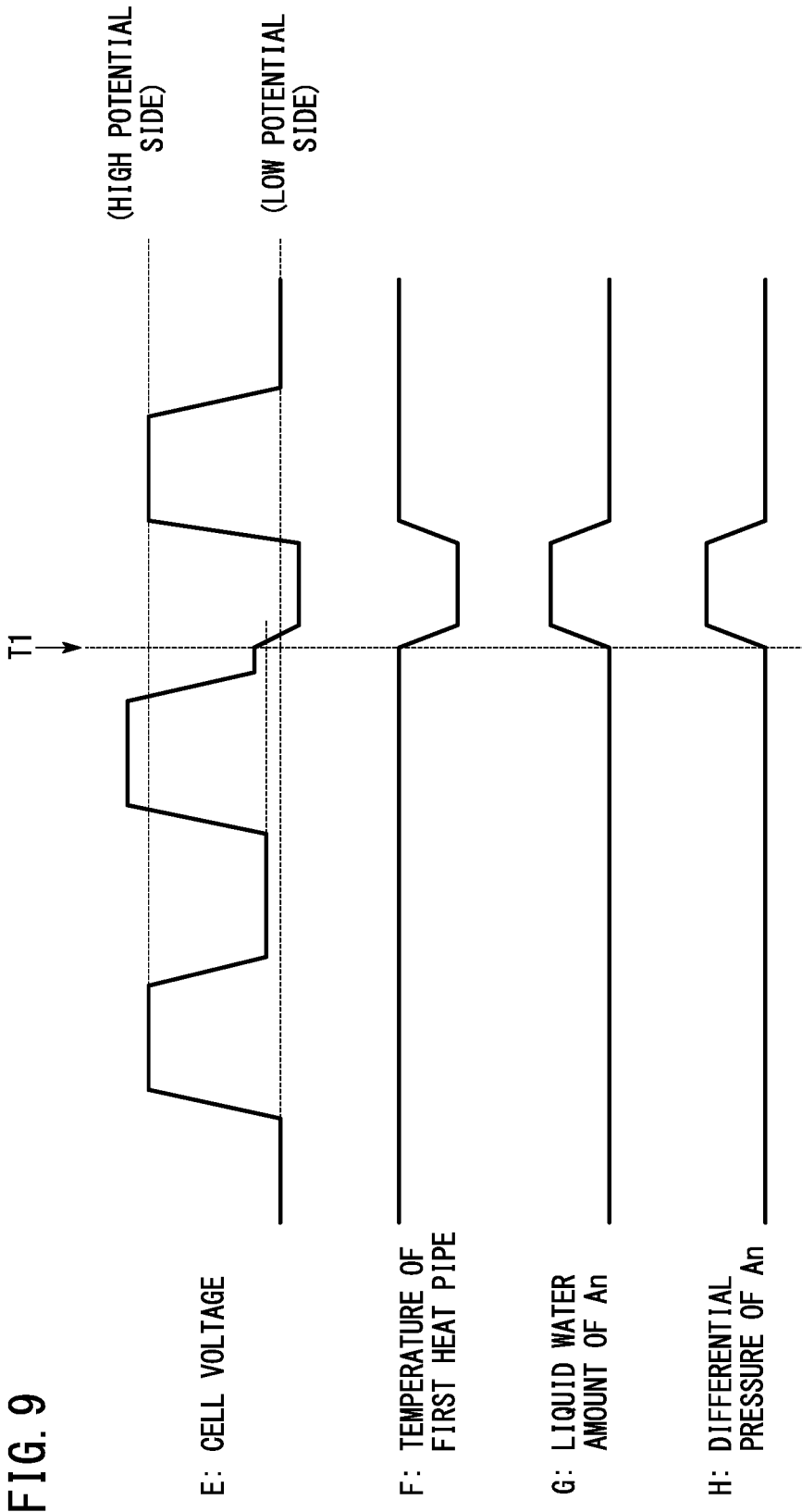
FIG. 9 is a graph showing a change in a cell voltage, a change in a temperature of a first heat pipe, a change in an amount of liquid water in an anode side flow path, and a change in a differential pressure on a side of the anode.

Specifically, the control unit 154 records the cell voltage at the time when the value of the load current is maximum. Hereinafter, such a cell voltage will be referred to as a "low potential side cell voltage". As described previously, the low potential side cell voltage rises accompanying the elapse of time. At a time when the low potential side cell voltage has been maintained at a predetermined upper limit value over a certain period of time, the control unit 154 determines that "the low potential side cell voltage of the MEA 10 is at an appropriate upper limit". In FIG. 9, the timing at which the control unit 154 makes this determination is indicated by T1. Moreover, the control unit 154 performs the same determination as the above, also at a time at which the difference in pressure between the first gas supply line 110 and the first gas discharge line 120 has reached the predetermined lower limit value.

Having made the above-described determination, the control unit 154 reduces the degree of cooling of the first cooling unit 86, and causes the temperature of the working fluid 92 in the first heat pipe 70 to be lowered, as indicated by the graph F shown in FIG. 9. Moreover, in FIG. 9, for the sake of convenience, the temperature of the working fluid 92 inside the first heat pipe 70 is expressed as a "temperature of the first heat pipe 70".

Consequently, since the dew point in the anode side flow path 48 decreases, as indicated by the graph G shown in FIG. 9, the amount of the liquid water generated in the anode side flow path 48 increases. As a result, the concentration overpotential of the cell rises and the cell voltage drops. Along therewith, the low potential side cell voltage also drops.

More specifically, according to the second embodiment, at a time when the low potential side cell voltage has been maintained at a predetermined upper limit value over a certain period of time, the control unit 154 performs a control to increase the amount of the liquid water in the anode side flow path 48. Due to such a control, the concentration overpotential of the cell rises. As a result, the cell voltage drops. Accordingly, the low potential side cell voltage drops. Consequently, the aging of the MEA 10 proceeds, even at a time when the load current is increased and the cell voltage is made to decrease.

When it has become a time to cause the cell voltage to rise, the control unit 154 causes the load current to be reduced. Consequently, the cell voltage rises as indicated by the graph E shown in FIG. 9. Further, the control unit 154 decreases the degree of cooling by the first cooling unit 86. Consequently, since the dew point in the anode side flow path 48 rises, as shown in the graph G, the amount of the liquid water generated in the anode side flow path 48 decreases. Further, as shown in the graph H, the differential pressure measured by the anode differential pressure gauge 162 decreases. In subsequent cycles, at a time when the low potential side cell voltage has reached a predetermined upper limit value during the electrical power generation aging process, the low potential side cell voltage is lowered in the same manner as described previously.

Moreover, it should be noted that the following control may be performed at a time when the low potential side cell voltage that has been lowered has reached the predetermined lower limit value. In this case, the control unit 154 determines that "the low potential side cell voltage of the MEA 10 is the appropriate lower limit". Moreover, the control unit 154 performs the same determination as the above, at a time at which the difference in pressure between the first gas supply line 110 and the first gas discharge line 120 has reached the predetermined upper limit value. The control unit 154, having performed the determination in this manner, decreases the degree of cooling by the first cooling unit 86.

Consequently, since the dew point in the anode side flow path 48 rises, as shown in the graph G, the amount of the liquid water generated in the anode side flow path 48 decreases. As a result, the concentration overpotential of the cell drops, and the cell voltage rises as shown in the graph E. Along therewith, the low potential side cell voltage also rises.

Alternatively, the degree of cooling by the second cooling unit 87 may be adjusted. In this case, the amount of the liquid water in the cathode side flow path 54 is controlled.

In the foregoing manner, according to the second embodiment, an information signal concerning the cell voltage (or the low potential side cell voltage) is constantly transmitted to the control unit 154. Upon having recognized that the low potential side cell voltage has arrived at the predetermined upper limit value or lower limit value, the control unit 154 causes the amount of the liquid water in the anode side flow path 48 or the cathode side flow path 54 to change. Consequently, it is possible to cause the low potential side cell voltage to be decreased or increased.

In this manner, the technique of lowering or raising the low potential side cell voltage by causing a change in the amount of the liquid water in the anode side flow path 48 or the cathode side flow path 54 at the time when the electrical power is generated can also be applied to a low oxygen concentration electrical power generation aging process. The low oxygen concentration electrical power generation aging process is defined as an electrical power generation aging process in which the oxygen concentration in the wet oxygen-containing gas that is supplied to the cathode 16 is lowered, and the low potential side cell voltage is further lowered. In the low oxygen concentration electrical power generation aging process also, the cell voltage is varied at the time when the electrical power is generated. Even in the case of a normal electrical power generation aging process in which the cell voltage is not lowered or raised, an appropriate liquid water control by the first heat pipe 70 (or the second heat pipe 82) is capable of cleaning the toxic substances in the same manner as described above. Further, the drainage performance is improved. In the low oxygen concentration electrical power generation aging process also, the toxic substances are capable of being washed away similarly, and the drainage performance is improved.

The control unit 154, having recognized that the predetermined time period has elapsed since the power generation step S30 was started, controls the first three-way valve 116 and the second three-way valve 136 in order to transition to the re-scavenging step S40. Specifically, the control unit 154 controls the first three-way valve 116, and thereby interrupts the communication between the hydrogen gas supply unit 112 and the first gas supply line 110, and in addition, places the nitrogen gas supply unit 114 and the first gas supply line 110 in communication. Further, the control unit 154 controls the second three-way valve 136, and thereby interrupts the communication between the second gas supply line 130 and the oxygen-containing gas supply unit 134, and in addition, places the second gas supply line 130 and the nitrogen gas supply unit 132 in communication.

In this state, the nitrogen gas is supplied from the nitrogen gas supply unit 114 to the anode side flow path 48, and additionally, is supplied from the nitrogen gas supply unit 132 to the cathode side flow path 54. The nitrogen gas becomes a wet nitrogen gas by passing through the same flow path as the nitrogen gas flow path in the scavenging step S10, and the wet nitrogen gas is supplied to the anode 14 and the cathode 16. The wet nitrogen gas passes through the first gas discharge line 120 and the second gas discharge line 140, and is discharged respectively from the first discharge valve 122 and the second discharge valve 142. More specifically, the gases in the anode side flow path 48 and the cathode side flow path 54 are replaced with the wet nitrogen gas.

Consequently, the re-scavenging step S40 is brought to an end. Thereafter, the first three-way valve 116, the second three-way valve 136, the first discharge valve 122, and the second discharge valve 142 are closed, and thereby the MEA 10 is disconnected from the activation device 40. In the same manner as in the first embodiment, in the case that the MEA 10 is utilized and the fuel cell stack is assembled, in a large number of such cases, the fuel cell stack exhibits a predetermined electrical power generation performance.

As has been described above, the present embodiment is characterized by the activation method for the fuel cell that activates the membrane electrode assembly (10) for use by the fuel cell including the electrolyte membrane (12) and the anode (14) and the cathode (16) sandwiching the electrolyte membrane therebetween, the activation method including the aging step (S3) of applying the variable voltage from the voltage application unit (170) to the membrane electrode assembly while supplying the first gas to the anode from the anode side flow path (48), and supplying the second gas to the cathode from the cathode side flow path (54), and the voltage application step (S5) of applying the voltage of a constant value from the voltage application unit to the membrane electrode assembly while supplying the first gas to the anode from the anode side flow path, and supplying the second gas to the cathode from the cathode side flow path, wherein, in the voltage application step, liquid water is generated in the anode or the cathode, and the amount of the liquid water is adjusted by the liquid water amount adjustment unit.

Further, the present embodiment is characterized by the activation device (40) that activates the membrane electrode assembly (10) for use by a fuel cell including the electrolyte membrane (12) and the anode (14) and the cathode (16) sandwiching the electrolyte membrane therebetween, the activation device including the first gas supply line (110) that supplies the first gas to the anode, the second gas supply line (130) that supplies the second gas to the cathode, the voltage application unit (170) that applies a voltage to the membrane electrode assembly, and the liquid water amount adjustment unit which causes the liquid water to be generated in the anode or the cathode, and in addition, adjusts the amount of the liquid water.

According to the present embodiment, it is possible to cause the liquid water to be generated after the aging step. Toxic substances which are stripped away from the electrode catalyst in the aging step are removed from the membrane electrode assembly together with the liquid water. Stated otherwise, in this case, the anode and the cathode are capable of being cleaned. Accordingly, re-adsorption of impurities to the electrode catalyst is suppressed.

Further, the amount of the liquid water in the anode side flow path or the cathode side flow path is adjusted by the liquid water amount adjustment unit. Accordingly, the membrane electrode assembly, for example, can be returned to a suitable humidified state in order to perform the next cycle of aging.

The present embodiment is characterized by the activation method for the fuel cell for activating the membrane electrode assembly (10) for use by the fuel cell including the electrolyte membrane (12) and the anode (14) and the cathode (16) sandwiching the electrolyte membrane therebetween, the activation method including the electrical power generation step (S30) of causing electrical power to be generated in the membrane electrode assembly while supplying a first gas to the anode from the anode side flow path (48), and supplying the second gas to the cathode from the cathode side flow path (54), wherein, in the electrical power generation step, the generated electrical voltage of the membrane electrode assembly is repeatedly raised and lowered, and the amount of the liquid water generated in the anode or the cathode is adjusted by the liquid water amount adjustment unit.

Further, the present embodiment is characterized by the activation device (200) that activates the membrane electrode assembly (10) for use by the fuel cell including the electrolyte membrane (12) and the anode (14) and the cathode (16) sandwiching the electrolyte membrane therebetween, the activation device including the first gas supply line (110) that supplies, to the anode, the first gas in order to generate electricity, the second gas supply line (130) that supplies, to the cathode, the second gas in order to generate electricity, and the liquid water amount adjustment unit that adjusts the amount of the liquid water generated at the anode or the cathode while the membrane electrode assembly is generating electricity.

In this case, due to the power generation, the impurities are stripped from the electrode catalyst. Impurities which are stripped from the electrode catalyst are discharged together with the liquid water (mainly, the produced water) from the anode side flow path or the cathode side flow path. Accordingly, re-adsorption of impurities to the electrode catalyst is suppressed.

In the electrical power generation step, the amount of the liquid water generated in the anode or the cathode is adjusted based on, in particular, the low potential side cell voltage of the membrane electrode assembly. When the amount of the liquid water increases, the concentration overpotential of the cell rises. Along therewith, the cell voltage is lowered. Accordingly, even under a situation in which the activation overpotential is lowered due to the generation of electrical power, the low potential side cell voltage can be made to decrease. Therefore, since the cell voltage is lowered to the predetermined voltage, the degree of activation of the membrane electrode assembly can be enhanced.

In the present embodiment, the activation method for the fuel cell is disclosed, in which the temperature adjustment unit (86, 87) that adjusts the dew point of the anode side flow path and the dew point of the cathode side flow path is used as the liquid water amount adjustment unit, and the temperature adjustment unit includes the first jig (42) in which the first heat pipe (70) that serves to exchange heat with the first gas is provided, and the second jig (44) in which the second heat pipe (82) that serves to exchange heat with the second gas is provided.

In the present embodiment, the activation device is disclosed, in which the liquid water amount adjustment unit includes the temperature adjustment unit (86, 87) that adjusts the dew point of the anode side flow path and the dew point of the cathode side flow path, and the temperature adjustment unit includes the first jig (42) in which the first heat pipe (70) that serves to exchange heat with the first gas is provided, and the second jig (44) in which the second heat pipe (82) that serves to exchange heat with the second gas is provided.

In the first heat pipe and the second heat pipe, the response speed with respect to the input heat or the output heat is high.

Therefore, the temperature of the first gas in the anode side flow path, or the temperature of the second gas in the cathode side flow path is quickly adjusted. Accordingly, the amount of the liquid water in the cathode side flow path and the anode side flow path changes in a comparatively short period of time. Stated otherwise, the amount of the liquid water can be adjusted in a comparatively short period of time.

In the present embodiment, the activation method for the fuel cell is disclosed, in which the temperature adjustment unit includes the humidification state acquisition unit (150) that acquires the index in relation to the state of humidification of the membrane electrode assembly, and at a time when the index acquired by the humidification state acquisition unit has reached the predetermined threshold value, the temperature adjustment unit changes the temperature of the first heat pipe and the temperature of the second heat pipe.

In the present embodiment, the activation device is disclosed, in which the temperature adjustment unit includes the humidification state acquisition unit (150) that acquires the index in relation to the state of humidification of the membrane electrode assembly, and the temperature adjustment unit changes the temperature of the first heat pipe and the temperature of the second heat pipe at a time when the index acquired by the humidification state acquisition unit has reached the predetermined threshold value.

In this case, how much heat the first heat pipe captures from the first gas, or alternatively, how much heat the second heat pipe captures from the second gas is determined based on the index. More specifically, by acquiring the index, it is possible to easily control the amount of the liquid water by adjusting the temperatures of the first wet gas and the second wet gas.

In the present embodiment, the activation method for the fuel cell is disclosed, in which the anode side flow path is formed in the first jig, the cathode side flow path is formed in the second jig, and the membrane electrode assembly is sandwiched alone between the first jig and the second jig.

In the present embodiment, the activation device is disclosed, in which the anode side flow path is formed in the first jig, the cathode side flow path is formed in the second jig, and the membrane electrode assembly is sandwiched alone between the first jig and the second jig.

There are case where, after having stacked the unit cells and obtained the fuel cell stack, activation of the fuel cell stack may be implemented. In these cases, at a time when a predetermined electrical power generation performance cannot be obtained when a power generation test is carried out after the activation, it is necessary to disassemble the fuel cell stack, and then to reassemble the fuel cell stack after having removed the defective unit cell.

In contrast thereto, according to the present embodiment, by using an MEA which is determined to have been sufficiently activated, the unit cell can be assembled. In the case that a fuel cell stack is assembled using such a unit cell, a situation is avoided in which a unit cell that has not been sufficiently activated is incorporated in the fuel cell stack. Therefore, in a large number of such cases, the fuel cell stack exhibits the predetermined power generation performance. Accordingly, there is almost no need to disassemble the fuel cell stack and to remove a defective unit cell. Further, there is almost no need to reassemble the fuel cell stack.

Moreover, it should be noted that the present invention is capable of adopting the following configurations.

For example, instead of the first cooling unit 86 and the second cooling unit 87, two heat supplying units may be provided. Alternatively, one cooling unit or one heat supplying unit may be provided to straddle across the anode 14 and the cathode 16. In either of such cases, it is also possible to provide both the cooling unit and the heat supplying unit alongside one another.

In the first embodiment and the second embodiment, the resistance or the impedance of the MEA 10 may be measured. After the gas supplying step S2, the following determinations can be made, in a state in which both of the electrodes 14, 16 and the electrolyte membrane 12 are sufficiently humidified and stabilized. Specifically, at a time when the resistance or the impedance has risen, the control unit 154 determines that the amount of the liquid water is increasing in the anode side flow path 48 or the cathode side flow path 54. In the case that the resistance or the impedance has reach the upper limit value, the control unit 154 controls the first cooling unit 86 or the second cooling unit 87, and thereby causes the temperature of the first heat pipe 70 or the temperature of the second heat pipe 82 to rise. In accordance with this feature, the dew point in the anode side flow path 48 or the cathode side flow path 54 rises. Accordingly, the amount of the liquid water in the anode side flow path 48 or the cathode side flow path 54 decreases.

At a time when the resistance or the impedance has fallen, the control unit 154 determines that the amount of the liquid water is decreasing in the anode side flow path 48 or the cathode side flow path 54. In the case that the resistance or the impedance has reached the lower limit value, the control unit 154 performs a control that is opposite to that stated previously. In this manner, the resistance or the impedance can also serve as an index for grasping the state of humidification of the MEA 10.

According to the present embodiment, activation is carried out with respect to a single MEA 10. However, it is also possible to perform the activation while the amount of the liquid water is adjusted by the liquid water amount adjusting unit during the time that the voltage is applied to the fuel cell stack. Alternatively, it is also possible to perform the activation while the amount of the liquid water is adjusted by the liquid water amount adjusting unit during the time that the fuel cell stack is being made to generate electricity. In this manner, the present invention can be applied to the activation of a fuel cell stack. That is, the present invention is not particularly limited to an aspect in which activation is implemented with respect to a single MEA 10.

The present invention is not limited to the above disclosure, and various modifications can be adopted therein without departing from the essence and gist of the present invention.

The invention claimed is:

1. An activation method for a fuel cell, for activating a membrane electrode assembly for use by the fuel cell including an electrolyte membrane and an anode and a cathode sandwiching the electrolyte membrane therebetween, the activation method comprising:

applying a variable voltage from a voltage application unit to the membrane electrode assembly while supplying a first gas to the anode from an anode side flow path, and supplying a second gas to the cathode from a cathode side flow path; and applying a voltage of a constant value from the voltage application unit to the membrane electrode assembly while supplying the first gas to the anode from the anode side flow path, and supplying the second gas to the cathode from the cathode side flow path, wherein, in the applying of the voltage of the constant value, liquid water is generated in the anode or the cathode, and an amount of the liquid water is adjusted by a liquid water amount adjustment unit.

2. The activation method for the fuel cell according to claim 1, wherein:

a temperature adjustment unit configured to adjust a dew point of the anode side flow path and a dew point of the cathode side flow path is used as the liquid water amount adjustment unit; and the temperature adjustment unit includes a first jig in which a first heat pipe configured to exchange heat with the first gas is provided, and a second jig in which a second heat pipe configured to exchange heat with the second gas is provided.

3. The activation method for the fuel cell according to claim 2, wherein:

the temperature adjustment unit includes a humidification state acquisition unit configured to acquire an index in relation to a state of humidification of the membrane electrode assembly; and at a time when the index acquired by the humidification state acquisition unit has reached a predetermined threshold value, the temperature adjustment unit changes a temperature of the first heat pipe and a temperature of the second heat pipe.

4. The activation method for the fuel cell according to claim 2, wherein the anode side flow path is formed in the first jig, the cathode side flow path is formed in the second jig, and the membrane electrode assembly is sandwiched alone between the first jig and the second jig.

5. An activation method for a fuel cell, for activating a membrane electrode assembly for use by the fuel cell including an electrolyte membrane and an anode and a cathode sandwiching the electrolyte membrane therebetween, the activation method comprising:

causing electrical power to be generated in the membrane electrode assembly while supplying a first gas to the anode from an anode side flow path, and supplying a second gas to the cathode from a cathode side flow path, wherein, in the causing the electrical power to be generated, a generated electrical voltage of the membrane electrode assembly is repeatedly raised and lowered, and an amount of liquid water generated in the anode or the cathode is adjusted by a liquid water amount adjustment unit, and a temperature adjustment unit configured to adjust a dew point of the anode side flow path and a dew point of the cathode side flow path is used as the liquid water amount adjustment unit; and the temperature adjustment unit includes a first jig in which a first heat pipe configured to exchange heat with the first gas is provided, and a second jig in which a second heat pipe configured to exchange heat with the second gas is provided.

6. The activation method for the fuel cell according to claim 5, wherein:

the temperature adjustment unit includes a humidification state acquisition unit configured to acquire an index in relation to a state of humidification of the membrane electrode assembly; and at a time when the index acquired by the humidification state acquisition unit has reached a predetermined threshold value, the temperature adjustment unit changes a temperature of the first heat pipe and a temperature of the second heat pipe.

7. The activation method for the fuel cell according to claim 5, wherein the anode side flow path is formed in the first jig, the cathode side flow path is formed in the second jig, and the membrane electrode assembly is sandwiched alone between the first jig and the second jig.

8. An activation device that activates a membrane electrode assembly for use by a fuel cell including an electrolyte membrane and an anode and a cathode sandwiching the electrolyte membrane therebetween, the activation device comprising:

a first gas supply line configured to supply a first gas to the anode;

a second gas supply line configured to supply a second gas to the cathode;

a voltage application unit configured to apply a voltage to the membrane electrode assembly; and a liquid water amount adjustment unit configured to cause liquid water to be generated in the anode or the cathode, and to adjust an amount of the liquid water, wherein:

the liquid water amount adjustment unit includes a temperature adjustment unit configured to adjust a dew point of an anode side flow path and a dew point of a cathode side flow path; and the temperature adjustment unit includes a first jig in which a first heat pipe configured to exchange heat with the first gas is provided, and a second jig in which a second heat pipe configured to exchange heat with the second gas is provided.

9. The activation device according to claim 8, wherein:

the temperature adjustment unit includes a humidification state acquisition unit configured to acquire an index in relation to a state of humidification of the membrane electrode assembly; and the temperature adjustment unit changes a temperature of the first heat pipe and a temperature of the second heat pipe at a time when the index acquired by the humidification state acquisition unit has reached a predetermined threshold value.

10. The activation device according to claim 8, wherein the anode side flow path is formed in the first jig, the cathode side flow path is formed in the second jig, and the membrane electrode assembly is sandwiched alone between the first jig and the second jig.

11. An activation device that activates a membrane electrode assembly for use by a fuel cell including an electrolyte membrane and an anode and a cathode sandwiching the electrolyte membrane therebetween, the activation device comprising:

a first gas supply line configured to supply, to the anode, a first gas in order to generate electricity;

a second gas supply line configured to supply, to the cathode, a second gas in order to generate electricity; and a liquid water amount adjustment unit configured to adjust an amount of liquid water generated at the anode or the cathode while the membrane electrode assembly is generating electricity, wherein:

the liquid water amount adjustment unit includes a temperature adjustment unit configured to adjust a dew point of an anode side flow path and a dew point of a cathode side flow path; and the temperature adjustment unit includes a first jig in which a first heat pipe configured to exchange heat with the first gas is provided, and a second jig in which a second heat pipe configured to exchange heat with the second gas is provided.

12. The activation device according to claim 11, wherein:

the temperature adjustment unit includes a humidification state acquisition unit configured to acquire an index in relation to a state of humidification of the membrane electrode assembly; and the temperature adjustment unit changes a temperature of the first heat pipe and a temperature of the second heat pipe at a time when the index acquired by the humidification state acquisition unit has reached a predetermined threshold value.

13. The activation device according to claim 11, wherein the anode side flow path is formed in the first jig, the cathode side flow path is formed in the second jig, and the membrane electrode assembly is sandwiched alone between the first jig and the second jig.

* * * * *